April 13, 1926.

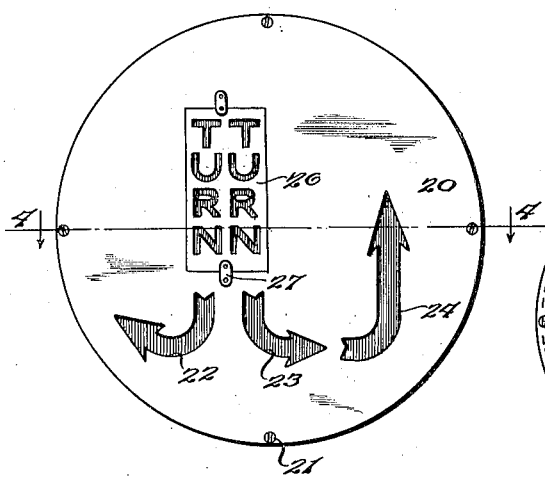
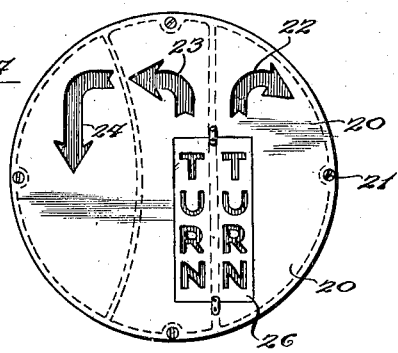
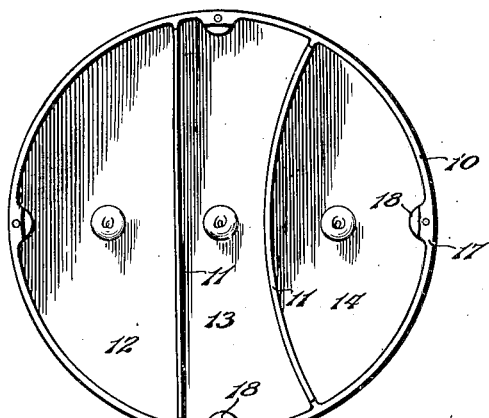
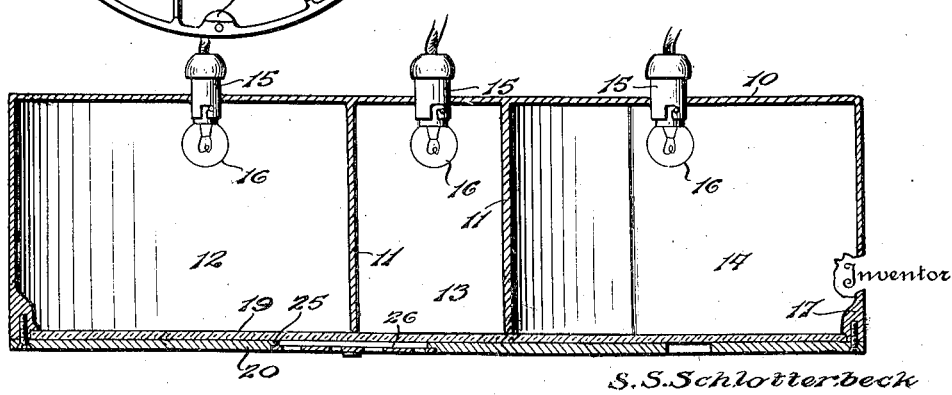

S. S. SCHLOTTERBECK 1,580,766

DIRECTION SIGNAL

Filed Jan. 18, 1924

Inventor
S. S. Schlotterbeck
By Lacey & Lacey, Attorneys

Patented Apr. 13, 1926.

1,580,766

UNITED STATES PATENT OFFICE.

SETH S. SCHLOTTERBECK, OF NEW PARIS, OHIO.

DIRECTION SIGNAL.

Application filed January 18, 1924. Serial No. 687,037.

*To all whom it may concern:*

Be it known that I, SETH S. SCHLOTTERBECK, citizen of the United States, residing at New Paris, in the county of Preble and State of Ohio, have invented certain new and useful Improvements in Direction Signals, of which the following is a specification.

This invention relates to an improved direction signal for motor vehicles and seeks, among other objects, to provide a signal whereby confusion of traffic may be minimized and collisions or other accidents avoided.

The invention seeks, as a further object, to provide a signal whereby a driver may, without releasing the steering wheel, easily and quickly indicate an intention to turn either to the right or left.

And the invention seeks, as a still further object, to provide a signal so constructed that the signal may be readily adapted for use either at the front of a vehicle or at the rear thereof.

Other and incidental objects will appear hereinafter.

In the drawings:

Figure 1 is a front elevation of the signal as used at the front of a vehicle.

Figure 2 is a view similar to Figure 1 showing the signal adapted for use at the rear of a vehicle.

Figure 3 is a view of the signal casing, the face plate and closure pane being removed.

Figure 4 is a horizontal sectional view on the line 4—4 of Figure 1, looking in the direction of the arrows.

Figure 5:
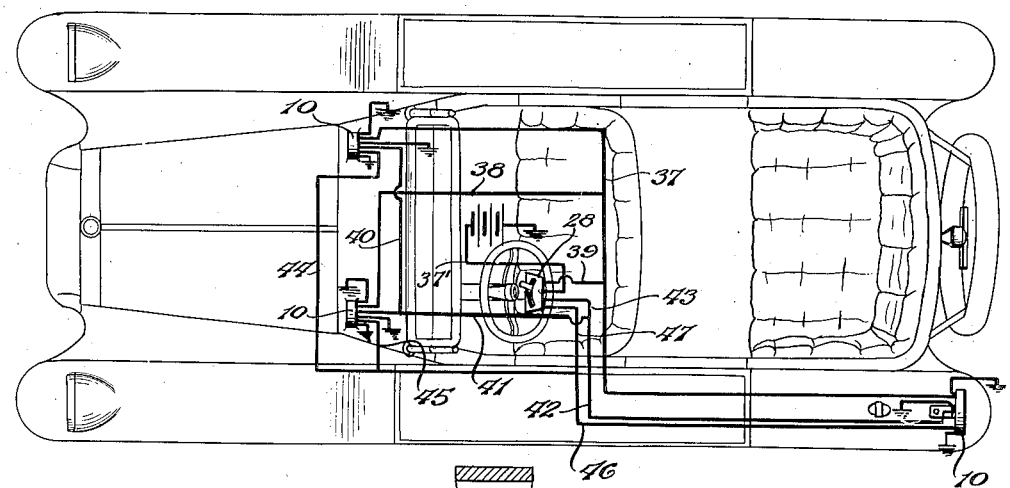
Figure 5 is a diagrammatic view showing the wiring system employed and illustrating a set of the signals in conjunction with a conventional motor vehicle.
Figure 6:
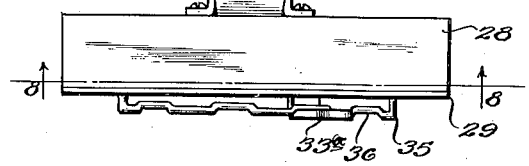
Figure 6 is a top plan view of the switch employed.
Figure 7:
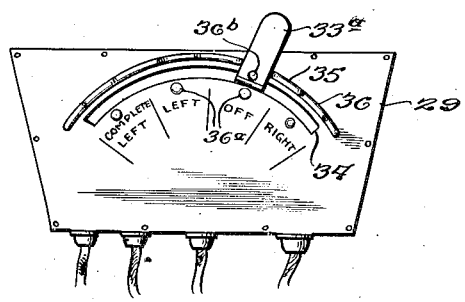
Figure 7 is a face view of the switch.
Figure 8:
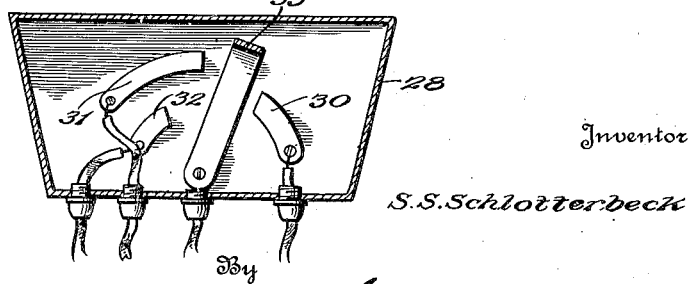
Figure 8 is a detail sectional view of the switch on the line 8—8 of Figure 6, looking in the direction of the arrows.

In carrying the invention into effect, I employ a preferably cylindrical casing 10 open at its forward side and closed at its rear side by an integral back wall. The casing may be of sheet metal or other approved material and integrally formed therewith are spaced partitions 11 dividing the casing into a number of compartments indicated for convenience at 12, 13 and 14. Inserted through the back wall of the casing are appropriate lamp sockets 15 projecting into said compartments respectively and removably mounted in said sockets are lamps 16.

Formed on the side wall of the casing at its forward margin are equi-distantly spaced bosses 17 cut away, as brought out in Figure 3, to form ledges 18 and resting upon said ledges is a closure pane 19 which is preferably tinted red, it being observed that the partitions 11 abut the closure pane at its rear side. Overlying the closure pane is a face plate 20. This plate is also preferably formed of suitable sheet metal and detachably securing the plate in position are cap screws 21 sunk into the bosses 17. Stenciled upon the face plate are direction indicators or arrows 22, 23 and 24 respectively, the arrow 22 being pointed to the right, the arrow 23 toward the left, and the arrow 24 being pointed to indicate a direction rearwardly from the left. At the base ends of the arrows 22 and 23 the face plate 20 is provided with an oblong opening into which projects, as particularly shown in Figure 4, a flange 25, and snugly fitting in said opening is a removable legend plate 26 resting against said flange. Screwed or otherwise secured to the face plate are spring clips 27 holding the legend plate in position. As brought out in Figures 1 and 2, the legend plate overlies one of the partitions 11 and at one side of said partition is stenciled the word Turn for the right arrow 22 while at the opposite side of said partition the plate is stenciled with the word Turn for the left arrow 23, the letters of the words being arranged in parallel rows. In installing the device, I preferably equip a motor vehicle, as conventionally shown in Figure 5, with three of the signals. For the signals used at the front of the vehicle, the face plate 20 and legend plate 26 of each of said signals are arranged as shown in Figure 1 of the drawings. However, for the signal used at the rear of the vehicle, the signal casing of said signal is, as shown in Figure 2, positioned so that the arrows 22, 23 and 24 appear at the upper side of the signal instead of at the lower side thereof as shown in Figure 1, while the legend plate 26 is turned end for end from the position shown in Figure 1, so that the legends upon the plate will appear right end up.

In conjunction with the several signals when employed as shown in Figure 5 of the drawings, I provide a switch controlling the signals. This switch is preferably mounted upon one of the spokes of the steering wheel so that said switch will be conveniently accessible, and includes a casing 28 normally closed by a front plate 29. Mounted within the casing are contacts 30, 31 and 32, and pivoted at its lower end to the back wall of the casing is a switch lever 33 offset to extend forwardly through a slot 34 in the front plate 29 and terminating at its outer end in a handle 33ª of suitable insulating material. Fixed at its ends to said front plate to extend above the slot is a segmental locking spring 35 provided with a plurality of spaced indentations 36 to selectively receive the free end portion of the lever and arranged upon the front plate opposite each of said indentations is a locating spot 36ª of luminous paint or the like. The handle 33ª of the lever also carries a similar luminous locating spot 36ᵇ so that at night, the operator may readily position the lever as desired. In electrically connecting the signals and switch, a wire 37 is led from the battery or other suitable source of electrical energy upon the vehicle to the switch lever 33. Connecting the lamps of the right hand compartments 12 of the several signals are wires 37 and 38 and connecting the wire 37 with the switch contact 30 is a wire 39. Connecting the lamps of the compartments 13 of the several signals are wires 40, 41 and 42, and connecting the latter wire with the switch contact 31 is a wire 43. Connecting the lamps of the compartments 14 of the several signals are wires 44, 45 and 46 and connecting the wire 46 with the switch contact 32 is a wire 47. As indicated in the diagram, the lamps of the signals are electrically grounded to the signal casing. Thus, when the switch lever 33 is swung to the right to engage the switch contact 30, the lamps of the right hand compartments 12 of all of the signals will be energized. Accordingly, the arrows 22 of each of the signals and the word Turn associated therewith will be illuminated for indicating an intention to turn to the right. Similarly, when the lever 33 is swung to engage the switch contact 31, the lamps of the compartments 13 of all the signals will be energized. Thus, the arrow 23 of each of the signals and the corresponding word Turn will be illuminated for indicating an intention of the driver to turn to the left. Likewise, when the switch lever is swung to simultaneously engage both of the contacts 31 and 32, the lamps of the compartments 13 as well as the lamps of the compartments 14 of all of the signals will be simultaneously energized. Accordingly, the arrow 23 and the corresponding word Turn as well as the arrow 24 of each of said signals will be illuminated for indicating an intention of the driver to make a complete left turn. I accordingly provide a device which will materially facilitate the movement of traffic and which, as will be perceived, may be readily installed.

Having thus described the invention, what is claimed as new is:

1. A direction signal for vehicles including a casing, a face plate carried thereby and provided with an indicator pointing in a given direction as well as a second indicator started as a continuation of the former indicator but having a terminus indicating a direction at substantially right angles to said first mentioned direction, a legend plate carried by the face plate and having a legend associated with the former indicator the casing being changeable in position to invert said indicators and the legend plate being reversible to afford a correct reading of said legend when the indicators are inverted whereby the signal may be used either at the front or rear of the vehicle, and means for illuminating said legend and said indicators.

2. A direction signal for vehicles including a casing, a face plate carried thereby and provided with a turn indicator pointing to the left as well as a second turn-around indicator pointing from the left turn indicator in a direction at substantially a right angle to the direction indicated by said left turn indicator, a legend plate carried by the face plate and having a legend associated with the former indicator, the casing being changeable in position to invert said indicators and the legend plate being reversible to afford a correct reading of said legend when the indicators are inverted whereby the signal may be used either at the front or rear of the vehicle, and means for illuminating said legend and said indicators.

3. A direction signal for vehicles including a casing, a face plate carried thereby and provided with indicators pointing toward the right and left respectively as well as a third indicator started as a continuation of one of the former indicators but having a terminus indicating a direction at substantially a right angle to the direction indicated by said former indicator, a legend plate carried by the face plate and having legends associated with the former indicators, the casing being changeable in position to invert said indicators and the legend plate being reversible to afford a correct reading of said legends when the indicators are inverted whereby the signal may be used either at the front or rear of the vehicle, and means for illuminating said legends and said indicators.

4. A direction signal for vehicles including a casing, a face plate carried thereby and provided with an indicator pointing in a given direction as well as a second indicator started as a continuation of the former indicator but having a terminus indicating a direction at substantially a right angle to said first mentioned direction, a legend plate carried by the face plate and provided with a legend associated with the former indicator and embodying a plurality of letters arranged in a vertical row, the casing being changeable in position to invert said indicators and the legend plate being reversible end for end to afford a correct reading of said legend when the indicators are inverted whereby the signal may be used either at the front or rear of the vehicle, and means for illuminating said legend and said indicators.

5. A direction signal for vehicles including a casing having a plurality of compartments, a face plate carried by the casing and provided at certain of said compartments with turn indicators pointing to the right and left respectively as well as at another of said compartments with a turn-around indicator pointing from the left turn indicator in a direction at substantially a right angle to the direction indicated by said left turn indicator, a legend plate carried by the face plate and provided with legends associated with the former indicators at said first mentioned compartments, the casing being changeable in position to invert said indicators and the legend plate being reversible to afford a correct reading of said legends when the indicators are inverted whereby the signal may be used either at the front or rear of the vehicle, and separate means for illuminating each of said compartments.

In testimony whereof I affix my signature.

SETH S. SCHLOTTERBECK. [L. S.]